UNITED STATES PATENT OFFICE.

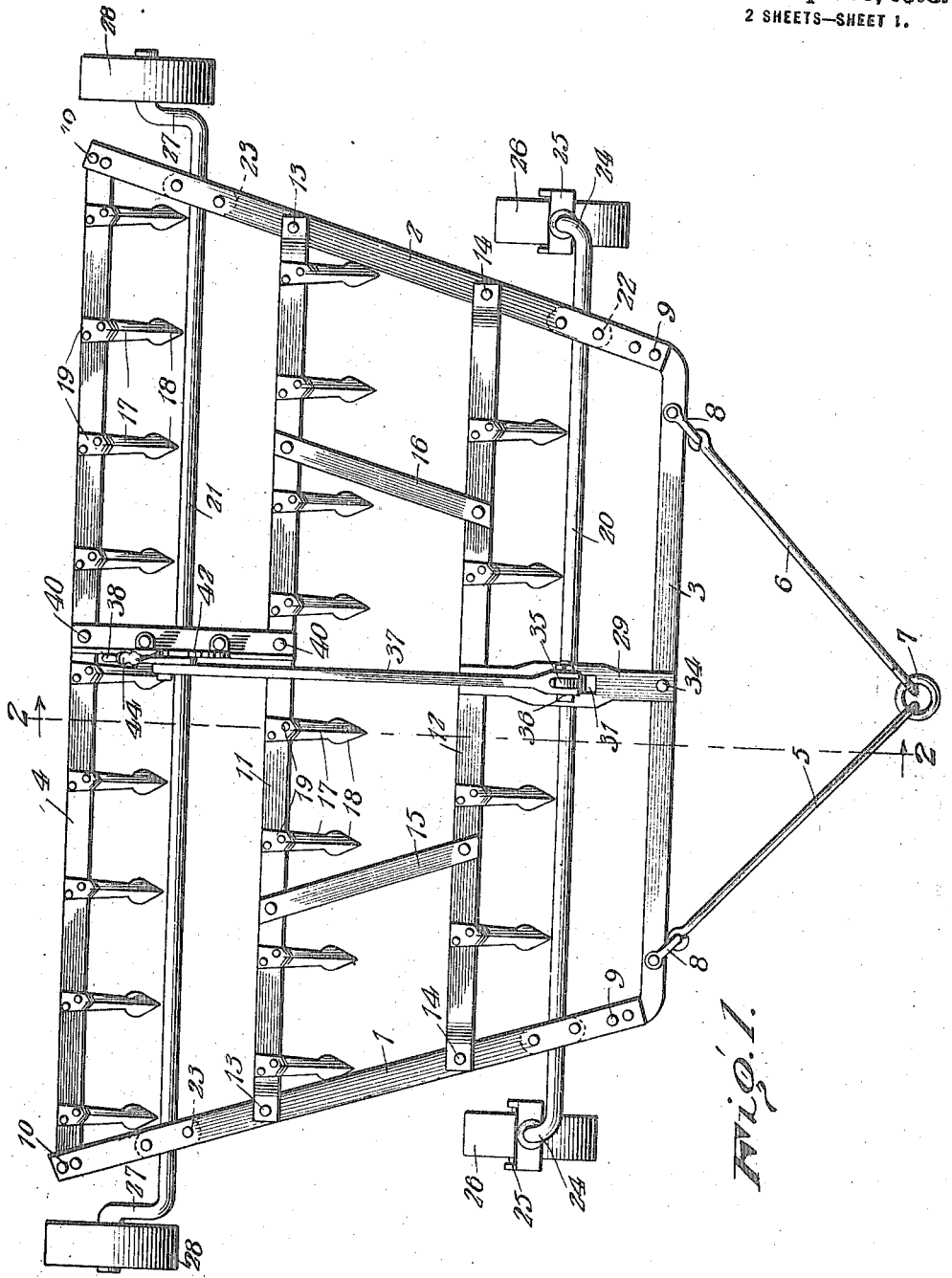

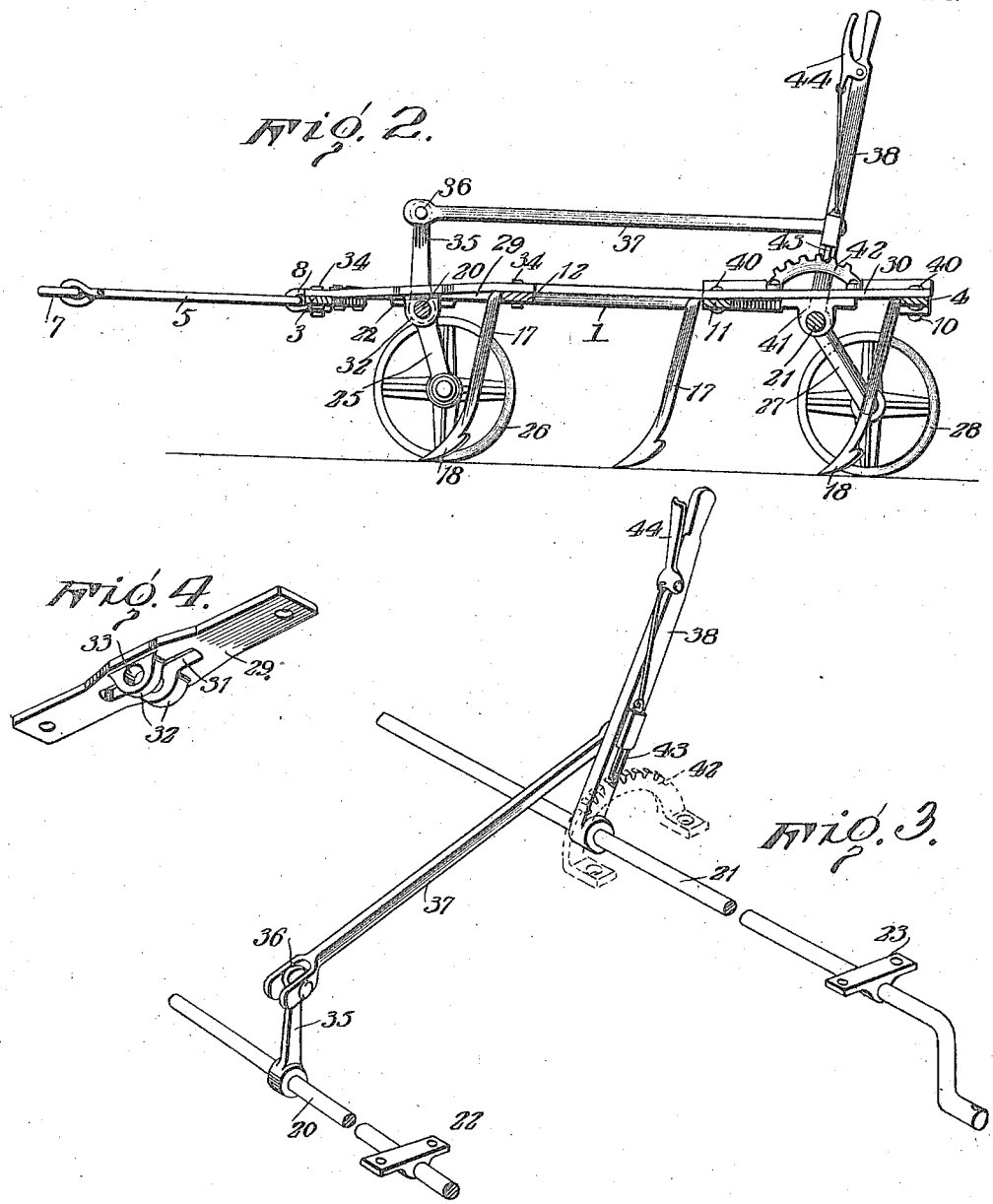

NILS P. JOHNSON, OF CROOKSTON, MINNESOTA.

WHEEL-HARROW.

1,263,422.   Specification of Letters Patent.   Patented Apr. 23, 1918.

Application filed May 1, 1916.   Serial No. 94,734.

*To all whom it may concern:*

Be it known that I, NILS P. JOHNSON, a citizen of the United States, and resident of Crookston, in the county of Polk and State of Minnesota, have invented certain new and useful Improvements in Wheel-Harrows, of which the following is a specification.

The present invention relates to new and useful improvements in wheel harrows and has particular reference to harrows of this character in which means are provided for raising and lowering the harrow teeth while traveling over the ground.

An object of my invention is to provide a harrow of the class described which is simple in construction, cheap to manufacture and strong and durable.

A further object of my invention is to provide a harrow of the class described having a compact body structure, the arrangement of the lifting mechanism for the harrow teeth being such that the user of the harrow need exert very little effort in manipulating the harrow.

Other objects and advantages to be derived from the use of my improved harrow will appear from the following detail description and the claim, taken with an inspection of the accompanying drawings, in which:

Figure 1 is a top plan view of a harrow embodying the improvements of my invention;

Fig. 2 is a longitudinal sectional view taken on the line 2—2 of Fig. 1 looking in the direction of the arrows;

Fig. 3 is a detached enlarged perspective view of the raising mechanism; and

Fig. 4 is an enlarged perspective view in detail of one of the bearing members in use of my improved harrow.

Referring more particularly to the drawings, wherein similar characters of reference designate like and corresponding parts throughout the various views, 1 and 2 designate the side bars of my improved harrow frame and 3 and 4 designate the front and rear bars thereof. The front bar is connected with a draft-animal by means of the rods 5 and 6 having their free ends engaged with the rings 7. The inner ends of the rods are pivotally engaged as at 8 with said bar 3. The free ends of the bars 3 are riveted as at 9 for engagement with the side bars 1 and 2 of the harrow frame. The rear bar 4 is riveted as at 10 to the side bars 1 and 2 similarly to the bar 3. The bar 3 being slightly shorter than the bar 4 forms a framework which is slightly tapering in configuration as best shown in Fig. 1.

A plurality of transversely arranged parallel bars 11 and 12 are provided, said bars having their free ends riveted as at 13 and 14 to the side bars 1 and 2, respectively. Relatively short brace bars 15 and 16 extend between said parallel bars in order to tend to make more rigid the frame of the harrow.

A plurality of harrow teeth are provided arranged on the bars 4, 11 and 12, the structure of said harrow teeth being best shown in Figs. 1 and 2. All of the teeth are identical in construction and a brief description of one will therefore suffice. Referring to Figs. 1 and 2 the harrowing members or teeth comprise leg portions 17 having forwardly bent sharpened lower extremities for engagement with the earth, the upper extremities of the legs 17 being bent as at 19 and riveted or otherwise secured to the bars 4, 11 and 12. The structure described in the foregoing pertains to the harrow body or frame and has associated therewith the raising mechanism hereinafter described in detail.

Referring now to the harrow raising mechanism the same preferably includes a pair of shafts 20 and 21 arranged forwardly and rearwardly of the harrow frame, said shafts being mounted in the bearings 22 and 23 carried by and beneath the guide bars 1 and 2. The forward bar 20 has the free ends thereof bent right angularly to form legs 24, said legs 24 carrying brackets 25 in which are journaled wheels 26. The rear shaft 21 is provided with right angularly formed portions 27 on its free ends, said portions 27 forming bearings for wheels 28.

The intermediate portions of the shafts 20 and 21 are mounted in bearing members 29 and 30 described in detail hereinafter, said bearing members serving to support both the manipulating mechanism on the shafts and said shafts.

The forward bearing 29 includes a plate having a slot 31 therein adjacent which are formed a pair of spaced ears 32 provided with bearing openings 33 which are in alinement. The bearing member 29 is riveted as at 34 to the bars 3 and 12. The slot 31 is provided for the accommodation of an arm 35 carried by the shaft 20, said arm projecting operatively from the frame and having connection as at 36 with a connecting bar 37, the free end of said bar 37 being connected with an operating lever 38 carried by the shaft 21. The rear bearing member 30 of the operating mechanism is preferably formed of an angle-iron riveted at 40 to the bars 4 and 11. The bearing member 30 carries a journal 41 in which is rotatably mounted the shaft 21. A segmental rack 42 is riveted or otherwise carried by the bearing member 30 and adapted to be engaged by a slidable lock 43 operable by a finger member 44 carried by the lever 38.

Of course, it is to be understood that I do not limit myself to the exact structure of the lever and the controlling mechanism, however, I desire to lay particular stress upon the arrangement of the forward and rear wheels of the device wherein the tapering construction is embodied. This arrangement tends to equalize the strain on the frame instead of applying the same to one or two points.

In operation it will be seen that by moving the lever 38 forwardly the wheels 26 and 28 may be raised lowering the harrowing element into engagement with the earth. By reversing the movement of the lever 38 the wheels may be swung into engagement with the ground thereby raising the harrowing element out of engagement with the earth. I desire to lay particular stress upon the improved arrangement of the mechanism for raising and lowering the harrowing frame particularly in view of the fact that the arrangement of the bearing members 29 and 30 serves to strengthen the same at this point rather than weaken the same which is a defect existing in many of the harrows now in use.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

A harrow including a main frame, harrowing elements carried by the frame, a bearing member secured to the forward and rear end of the same comprising a plate member having a longitudinally extending slot, ears extending from the plate members adjacent the slot having transversely extending bearing openings, a pair of shaft members arranged in parallel relation extending through the bearing openings, supporting wheels mounted on the shafts and eccentrically thereof, an operating lever extending through the longitudinally extending slot provided in the bearing plate mounted on the rear shaft and secured to the rear shaft, a bar pivotally secured to said arm and lever, and means secured to the frame and lever to retain the same in a desired elevation upon the operation of the lever.

In testimony whereof I affix my signature hereto.

NILS P. JOHNSON.

Copies of this patent may be obtained for five cents each, by addressing the "Commissioner of Patents, Washington, D. C."